United States Patent
Isono

(10) Patent No.: US 8,136,392 B2
(45) Date of Patent: Mar. 20, 2012

(54) PEDAL OPERATION AMOUNT DETECTING APPARATUS

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 371 days.

(21) Appl. No.: 12/527,474

(22) PCT Filed: Mar. 14, 2008

(86) PCT No.: PCT/JP2008/054740
§ 371 (c)(1),
(2), (4) Date: Aug. 17, 2009

(87) PCT Pub. No.: WO2008/114723
PCT Pub. Date: Sep. 25, 2008

(65) Prior Publication Data
US 2010/0095755 A1 Apr. 22, 2010

(30) Foreign Application Priority Data

Mar. 20, 2007 (JP) ................................. 2007-073489
Nov. 6, 2007 (JP) ................................. 2007-288139

(51) Int. Cl.
*G01M 17/00* (2006.01)
(52) U.S. Cl. ........................................................ 73/132
(58) Field of Classification Search ................... 73/121, 73/128, 129, 132
See application file for complete search history.

(56) References Cited

U.S. PATENT DOCUMENTS

| 6,021,704 | A | 2/2000 | Drumm et al. |
| 6,408,712 | B1 | 6/2002 | Bolisetty et al. |
| 7,212,914 | B2 * | 5/2007 | Wilczek et ..................... 701/115 |
| 8,001,870 | B2 * | 8/2011 | Saito et al. ...................... 74/513 |
| 2004/0238235 | A1 | 12/2004 | Saito et al. |
| 2005/0178234 | A1* | 8/2005 | Saito et al. ...................... 74/513 |
| 2005/0268741 | A1* | 12/2005 | Wilczek et al. ................. 74/513 |
| 2009/0049932 | A1 | 2/2009 | Isono et al. |

FOREIGN PATENT DOCUMENTS

JP 9 254778 9/1997

(Continued)

OTHER PUBLICATIONS

Extended European Search Report issued Sep. 20, 2010, in Application No. 08722136.2 - 2423 / 2123527 PCT/JP2008054740. Decision of a Patent Grant issued on Nov. 15, 2011 in the corresponding Japanese Patent Application No. 2007-288139 (with English Translation).

*Primary Examiner* — Eric S McCall
(74) *Attorney, Agent, or Firm* — Oblon, Spivak, McClelland, Maier & Neustadt, L.L.P.

(57) ABSTRACT

In a pedal operation amount detecting apparatus, a brake pedal and a crevice fixed to an end portion of an operation rod are rotatably coupled by a coupling shaft, a bush is interposed between the brake pedal and the coupling shaft, and detectors are mounted on an outer peripheral surface of a bush body, which is elastically deformable, in the bush, and an ECU estimates an angle between the brake pedal and the operation rod based on a ratio between distortion loads detected by the detectors, and calculates an operation amount of the brake pedal, that is to say, pedal force and a pedal stroke, based on the angle, thereby enabling to improve mountability by simplifying a configuration and to detect the operation amount with a high degree of accuracy.

11 Claims, 6 Drawing Sheets

FOREIGN PATENT DOCUMENTS

| | | |
|---|---|---|
| JP | 10 38507 | 2/1998 |
| JP | 11 501883 | 2/1999 |
| JP | 11 255084 | 9/1999 |
| JP | 2000 168532 | 6/2000 |
| JP | 2000-280872 | 10/2000 |
| JP | 2001 39276 | 2/2001 |
| JP | 2004 3908 | 1/2004 |
| JP | 2006-71506 | 3/2006 |

* cited by examiner

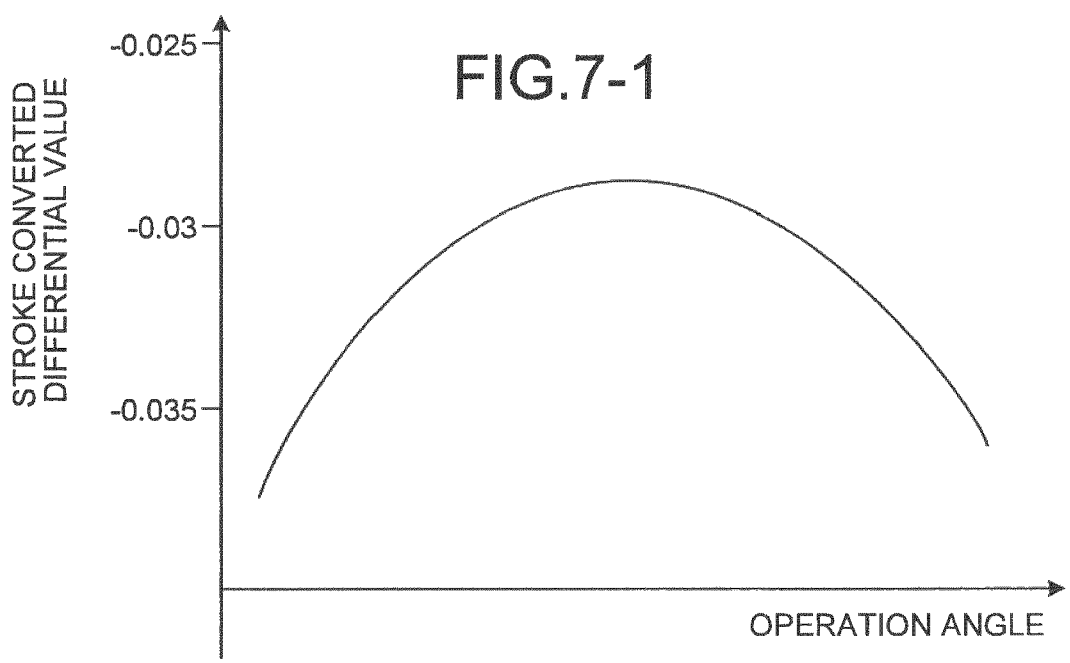
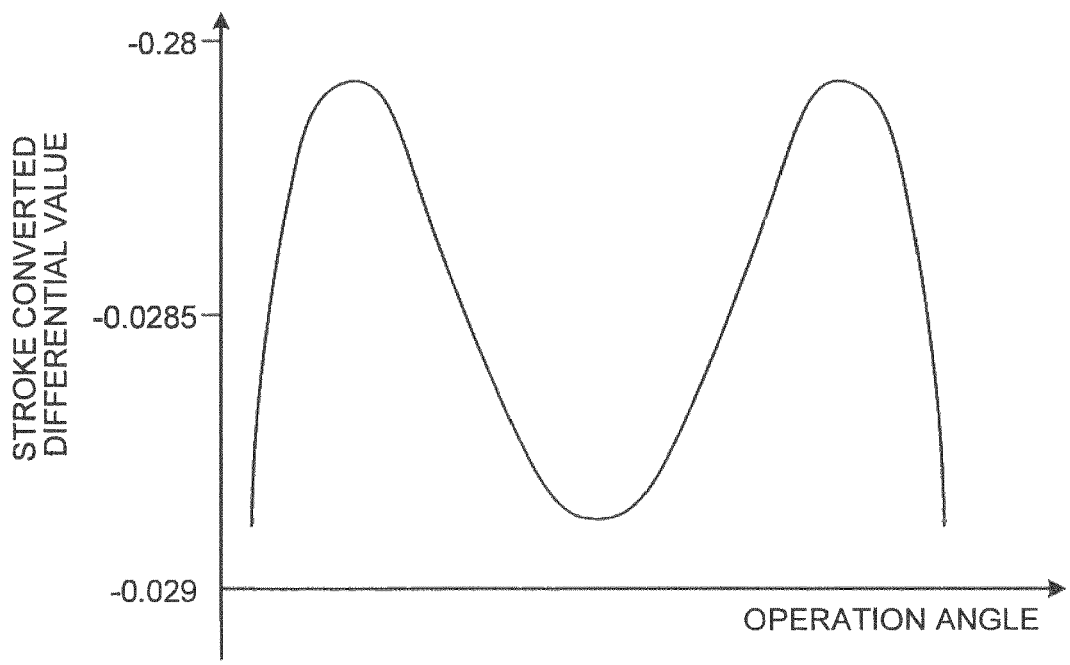

PEDAL OPERATION AMOUNT DETECTING APPARATUS

TECHNICAL FIELD

The present invention relates to a pedal operation amount detecting apparatus for detecting a pedal operation amount transmitted to operation target means by converting rotational motion of an operation pedal to linear motion of an operation rod.

BACKGROUND ART

For example, an Electrically Controlled Brake (ECB) is known as an electronically controlled brake apparatus for electrically controlling braking force by a brake apparatus, that is to say, braking hydraulic pressure to be supplied to a wheel cylinder for driving the brake apparatus according to an operation amount (such as a pedal stroke and pedal force) input from the brake pedal, as the brake apparatus of a vehicle.

The ECB is for accumulating the hydraulic pressure increased by a pump in an accumulator to supply to the wheel cylinder as the braking hydraulic pressure by controlling to adjust the same according to braking request by a driver. That is to say, when the driver depresses the brake pedal, while a master cylinder generates hydraulic pressure according to the operation amount thereof and a part of operating oil flows into a stroke simulator and the operation amount of the brake pedal according to the pedal force of the brake pedal is adjusted, the brake ECU sets target vehicle deceleration according to the pedal stroke to determine braking force distribution to be provided to each wheel, and provides predetermined hydraulic pressure from the accumulator to each wheel cylinder.

In such electronic controlled brake apparatus, it is required to detect the operation amount (such as the pedal stroke and the pedal force) input from the brake pedal with a high degree of accuracy. Patent Document 1 discloses a conventional operation amount detecting apparatus of a brake pedal.

The brake apparatus disclosed in Patent Document 1 is a brake pedal of which upper end portion is rotatably supported by a vehicle body in which an end portion of an input rod is rotatably coupled to an intermediate portion thereof through a crevice, a rotation lever is rotatably provided and a pedal force switch is fixed, and a movable rod of the pedal power switch can be pressed by the end portion of the rotation lever, and the pedal force can be detected by pressing the movable rod of the pedal force switch by rotation of the rotation lever by the operation of the brake pedal.

Patent Document 1: Japanese Patent Application Laid-open No. 2000-168532

DISCLOSURE OF INVENTION

Problem to be Solved by the Invention

In the operation amount detecting apparatus of the brake pedal in the above-described conventional brake apparatus, the rotation lever for transmitting operation force of the brake pedal to the pedal power switch is required, so that the configuration becomes complicated and a manufacturing cost increases. Also, in order to detect the pedal force with a high degree of accuracy, high manufacturing accuracy and assembling accuracy of the rotation lever should be secured, so that there is a problem of deterioration in mountability.

The present invention is to solve such a problem, and an object of the present invention is to provide a pedal operation amount detecting apparatus capable of improving the mountability by simplifying the configuration and of detecting the operation amount with a high degree of accuracy.

Means for Solving Problem

In order to solve the above mentioned problem and achieve the object, the pedal operation amount detecting apparatus for detecting a pedal operation amount transmitted to operation target unit by converting rotational motion of an operation pedal to linear motion of an operation rod according to the present invention includes angle estimating unit that estimates an angle between a first straight line connecting a rotation center of the operation pedal and a coupling point of the operation pedal and the operation rod and a second straight line along a linear motion direction of the operation rod; and pedal operation amount calculating unit that calculates a pedal operation amount based on an angle estimated by the angle estimating unit.

The pedal operation amount detecting apparatus according to the present invention may further include a load detecting unit provided on a coupling unit for coupling the operation pedal and the operation rod that detects a load acting on the coupling unit, and the angle estimating unit may estimate an angle between the first and second straight lines based on a load detected by the load detecting unit.

In the pedal operation amount detecting apparatus according to the present invention, the operation pedal and the operation rod may be coupled by a coupling member, and the load detecting unit may be interposed between the operation pedal and the coupling member or between the coupling member and the operation rod.

In the pedal operation amount detecting apparatus according to the present invention, a plurality of the load detecting units may be provided at different positions in a rotational direction of the operation pedal.

In the pedal operation amount detecting apparatus according to the present invention, a bush may be provided between the operation pedal and the coupling member or between the coupling member and the operation rod, and the load detecting unit may detect a distortion amount of the bush.

In the pedal operation amount detecting apparatus according to the present invention, a bush may be provided between the operation pedal and the coupling member or between the coupling member and the operation rod, and the load detecting unit may detect a compressive load of the bush.

In the pedal operation amount detecting apparatus according to the present invention, the pedal operation amount calculating unit may calculate a pedal force as the pedal operation amount based on an angle estimated by the angle estimating unit.

In the pedal operation amount detecting apparatus according to the present invention, the pedal operation amount calculating unit may calculate a pedal stroke as the pedal operation amount based on an angle estimated by the angle estimating unit.

In the pedal operation amount detecting apparatus according to the present invention, the angle estimating unit may estimate an angle between the first and second straight lines based on a change in the load detected by the load detecting unit.

In the pedal operation amount detecting apparatus according to the present invention, a plurality of the load detecting units may be provided at different positions in a rotational direction of the operation pedal, and the angle estimating unit may estimate an angle between the first and second straight lines based on a ratio between loads detected by the plurality of the load detecting units.

In the pedal operation amount detecting apparatus according to the present invention, a plurality of the load detecting units may be provided at different positions in a rotational direction of the operation pedal, and the angle estimating unit may estimate an angle between the first and second straight lines based on a ratio between loads detected by the plurality of the load detecting units and a load deviation.

Effect of the Invention

The pedal operation amount detecting apparatus according to the present invention is provided with the angle estimating means for estimating the angle between the first straight line connecting the rotation center of the operation pedal and the coupling point of the operation pedal and the operation rod and the second straight line along the linear motion direction of the operation rod, and a pedal operation amount calculating means for calculating the pedal operation amount based on the angle estimated by the angle estimating means, so that when the operation pedal is operated, the angle estimating means estimates the angle between the first and second straight lines, and the pedal operation amount calculating means calculates the pedal operation amount based on the estimated angle, so that the mountability can be improved by simplifying the configuration and the operation amount can be detected with a high degree of accuracy.

BRIEF DESCRIPTION OF DRAWINGS

FIG. 6-1 is a graph showing a pedal stroke with respect to a load variation average in the pedal operation amount detecting apparatus according to a third embodiment of the present invention.

FIG. 6-2 is a graph showing booster input load with respect to the pedal stroke in the pedal operation amount detecting apparatus of the third embodiment.

FIG. 6-3 is a graph showing a correction coefficient with respect to the load variation average in the pedal operation amount detecting apparatus of the third embodiment.

FIG. 7-1 is a graph showing a stroke converted differential value for calculating the pedal stroke by a first-order averaging.

FIG. 7-2 is a graph showing the stroke converted differential value for calculating the pedal stroke by the first-order averaging and a trigonometric function conversion.

EXPLANATIONS OF LETTERS OR NUMERALS 11 brake pedal (operation pedal)
15 operation rod
16 crevice (coupling member)
18 coupling shaft (coupling member)
21 coupling hole
22, 31 bush
23, 24, 33, 34 detector (load detecting unit)
25 electronic control unit, ECU (operation amount calculating means)
32 collar
38 supplementary load adjusting bolt (supplementary load adjusting means)

BEST MODE(S) FOR CARRYING OUT THE INVENTION

Hereinafter, embodiments of a pedal operation amount detecting apparatus according to the present invention is described in detail with reference to drawings. Meanwhile, the present invention is not limited by this embodiment.

First Embodiment

Figure 1:
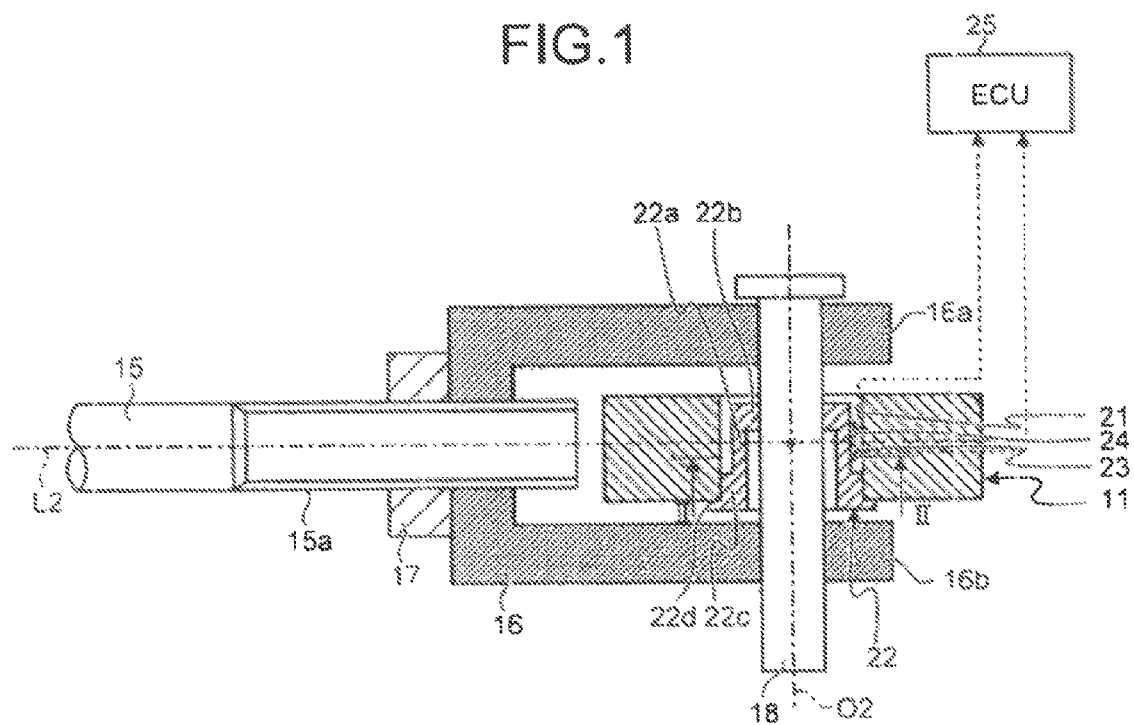
FIG. 1 is a horizontal cross-sectional schematic configuration diagram (cross-sectional view taken along line I-I of FIG. 3) showing a pedal operation amount detecting apparatus according to a first embodiment of the present invention.
Figure 2:
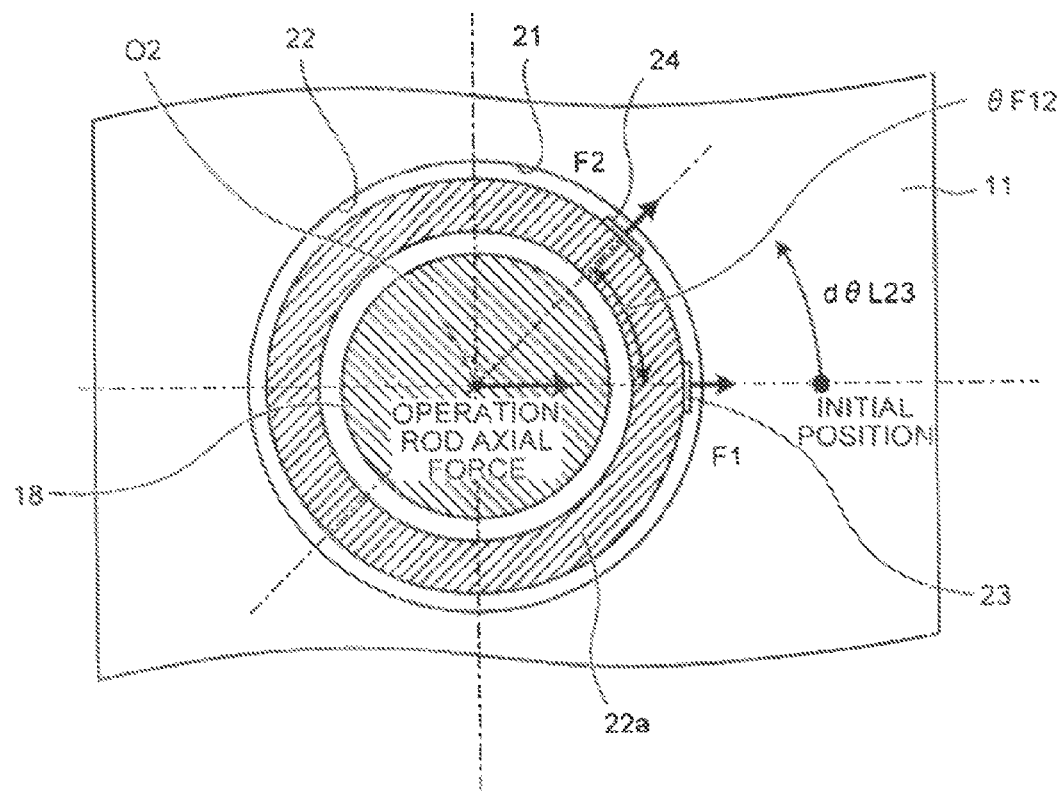
FIG. 2 is a cross-sectional view taken along line II-II of FIG. 1 showing an arrangement configuration of detectors in the pedal operation amount detecting apparatus according to the first embodiment.
Figure 3:
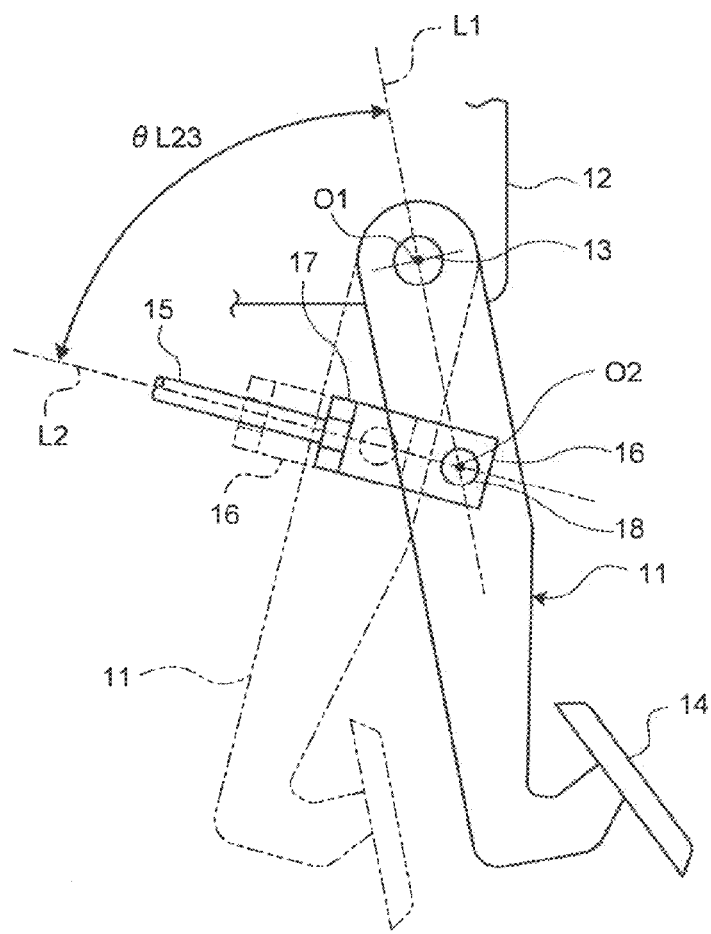
FIG. 3 is a front view of the pedal operation amount detecting apparatus of the first embodiment.
Figure 4:
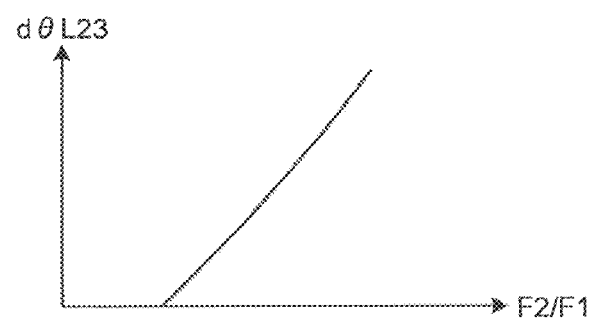
FIG. 4 is a graph showing an angle with respect to an output ratio of load detectors in the pedal operation amount detecting apparatus of the first embodiment.

FIG. 1 is a horizontal cross-sectional schematic configuration diagram (cross-sectional view taken along line I-I of FIG. 3) showing a pedal operation amount detecting apparatus according to a first embodiment of the present invention, FIG. 2 is a cross-sectional view taken along line II-II of FIG. 1 showing an arrangement configuration of detectors in the pedal operation amount detecting apparatus in the first embodiment, FIG. 3 is a front view of the pedal operation amount detecting apparatus in the first embodiment, and FIG. 4 is a graph showing an angle with respect to an output ratio of load detectors in the pedal operation amount detecting apparatus of the first embodiment.

In the pedal operation amount detecting apparatus of the first embodiment, as shown in FIGS. 1 to 3, a brake pedal 11 as an operation pedal is rotatably suspended from a mounting bracket 12 on a vehicle body side at an upper end portion thereof and supported by a support shaft 13, and a pedal 14, which can be depressed by a crew, is mounted on a lower end portion thereof. On the other hand, an operation rod 15 is coupled to a master cylinder and a brake booster (not shown) as operation target means for controlling operation of a brake apparatus at a tip end portion thereof.

Also, the operation rod 15 has a screw part 15a formed on a proximal end portion thereof, and the screw part 15a screws together with a crevice 16 and a lock nut 17 screws together with the operation rod 15 and contacts the crevice 16, thereby loosening of a screwed state of the operation rod 15 (screw part 15a) with the crevice 16 is prevented. The crevice 16 has forked portions 16a and 16b and the forked portions 16a and 16b are located on both sides of the brake pedal 11 at an intermediate portion thereof with a predetermined gap, and a coupling shaft 18 passes through the brake pedal 11 and the forked portions 16a and 16b to rotatably couple them.

Therefore, when the crew depresses the brake pedal 11, the brake pedal 11 rotates through the support shaft 13 and an operation amount (operation force) thereof is transmitted to the operation rod 15 through the coupling shaft 18 and the crevice 16, so that the operation rod 15 moves in an axial direction and may activate the brake booster and the master cylinder.

Meanwhile, in this embodiment, a coupling unit of the present invention, which couples the brake pedal 11 and the operation rod 15, is composed of the coupling shaft 18.

The pedal operation amount detecting apparatus of this embodiment is for detecting pedal force and a pedal stroke as the pedal operation amount to be transmitted to the master cylinder and the brake booster by converting rotational motion of the brake pedal 11 to linear motion of the operation rod 15. An angle estimating unit for estimating an angle θL23 between a first straight line L1 connecting a rotation center O1 of the brake pedal 11 and a coupling point O2 of the brake pedal 11 and the operation rod 15 and a second straight line L2 along a linear motion direction of the operation rod 15, and a pedal operation amount calculating unit for calculating a brake pedal operation amount based on the angle θL23 estimated by the angle estimating unit are provided.

In this case, the angle estimating unit is provided on the coupling unit for coupling the brake pedal 11 and the operation rod 15 and has a load detecting unit for detecting a load acting on the coupling shaft 18 to estimate the angle θL23 between the first and second straight lines L1 and L2 based on the load detected by the load detecting unit.

That is to say, a circular coupling hole 21 having a diameter larger than an outer diameter of the coupling shaft 18 is formed on the intermediate portion of the brake pedal 11. A cylindrical bush 22 is composed of a bush body 22a having a predetermined gap between an inner peripheral surface thereof and an outer peripheral surface of the coupling shaft 18 and a predetermined gap between an outer peripheral surface thereof and an inner peripheral surface of the coupling hole 21, a first supporting unit 22b of which inner peripheral surface contacts the outer peripheral surface of the coupling shaft 18 and having a predetermined gap between an outer peripheral surface thereof and the inner peripheral surface of the coupling hole 21, and a second supporting unit 22c of which outer peripheral surface contacts the inner peripheral surface of the coupling hole 21 and having a predetermined gap between an inner peripheral surface thereof and the outer peripheral surface of the coupling shaft 18, in which a flange portion 22d contacting an end surface of the brake pedal 11 is formed on the second supporting unit 22c. In this case, the bush 22 can be deformed by external force with the bush body 22a acting as an elastic portion.

The bush 22 is arranged in the coupling hole 21 of the brake pedal 11, and the bush body 22a loosely fits into the coupling hole 21 with a predetermined gap therebetween, the second supporting unit 22c fits into the coupling hole 21, and the flange portion 22d abuts an end surface of the brake pedal 11, so that the bush 22 is integrally fixed to the brake pedal 11. Also, the coupling shaft 18 passes through the forked portions 16a and 16b of the crevice 16 and passes through the bush 22 fixed to the brake pedal 11, loosely fits into the bush body 22a with a predetermined gap therebetween, and fits into the first supporting unit 22b, so that the bush 22 and the coupling shaft 18 can slidingly contact with each other.

Two detectors 23 and 24 as the above-described load detecting units are mounted on the outer peripheral surface of the bush body 22a of the bush 22 so as to be spaced apart from each other by a predetermined distance in a peripheral direction. In this embodiment, the two detectors 23 and 24 are mounted on the outer peripheral surface of the bush body 22a on a side opposite to a side to which the operation rod 15 is coupled, and the detectors 23 and 24 are arranged with a predetermined angle θF12 therebetween in the peripheral direction, thereby detecting the loads at different positions in the peripheral direction of the coupling shaft 18.

That is to say, when the brake pedal 11 is depressed, a reactive load acts on the first supporting unit 22b of the bush 22 from the operation rod 15 through the crevice 16 and the coupling shaft 18 against the load acting on the second supporting unit 22c of the bush 22, so that the bush body 22a deforms. At that time, the detectors 23 and 24 detect a distortion amount (load).

Detection result of the detectors 23 and 24 are input to an electronic control unit (ECU) 25 as the above-described angle estimating unit and the pedal operation amount calculating unit, and the ECU 25 estimates the angle θL23 between the first and second straight lines L1 and L2 based on a ratio between the loads detected by the detectors 23 and 24 and calculates the operation amount of the brake pedal 11, that is to say, pedal force, based on the angle θL23.

Specifically, when the brake pedal 11 is depressed, in the bush 22, the bush body 22a deforms with supporting units 22b and 22c as base points, so that the detector 23 detects a load F1 and the detector 24 detects a load F2. The ECU 25 estimates an angle dθL23 between the first and second straight lines L1 and L2 based on a ratio between the load F1 detected by the detector 23 and the load F2 detected by the detector 24. Herein, the angle dθL23 is an angle between initialized first and second straight lines L1 and L2 from an initial position. That is to say, relationship between a ratio of the loads F2/F1 and the angle dθL23 is as shown in a graph in FIG. 4.

Herein, a method of estimating by the ECU 25 the angle dθL23 between the first and second straight lines L1 and L2 based on the ratio between the load F1 detected by the detector 23 and the load F2 detected by the detector 24 is described.

A ratio of the loads RF12 is defined by the following equation:

$$RF12 = F2/F1$$

A ratio of the load RF12k when a reference load acts is defined by the following equation if defined at the time of assay of an individual sensor:

$$RF12k = F2k/F1k$$

Therefore, the angle dθL23 is defined by the following equation. Herein, Fb( ) is a correction function for correcting reference Fa( ).

$$d\theta L23 = Fa(RF12k)$$

$$d\theta L23 = Fa(RF12k) \times Fb(F1)$$

Thus normalized, pedal force (operation rod axial force) F using only an output of the detector 23 is calculated by the following equation. Herein, Fd( ) is a correction function for correcting reference Fc( ).

$$Fk = F1k \times Fc(d\theta L23)$$

$$F = F1 \times Fc(d\theta L23) \times Fd(F1)$$

On the other hand, the pedal force (operation rod axial force) F using only the output of the detector 24 is calculated by the following equation. Herein, Ff( ) is a correction function for correcting reference Fe( )

$$Fk = F2k \times Fe(d\theta L23)$$

$$F = F2 \times Fe(d\theta L23) \times Ff(F2)$$

Then, the pedal force (operation rod axial force) F using an output ratio between the detectors 23 and 24 is calculated by the following equation:

$$F = \{F1 \times Fc(d\theta L23) \times Fd(F1) + F2 \times Fe(d\theta L23) \times Ff(F2)\}/2$$

Also, a pedal stroke S is calculated by the following equation. Herein, Fg is a function according to an assembled state of the brake pedal 11 and the operation rod 15.

$$S=Fg(d\theta L23)$$

Therefore, as shown in FIGS. 1 to 3, when the crew depresses the brake pedal 11, the brake pedal 11 rotates clockwise in FIGS. 2 and 3 about the support shaft 13 by the pedal force. Then, the pedal force is input from the brake pedal 11 to the crevice 16 through the coupling shaft 18, and further is transmitted from the crevice 16 to the operation rod 15, and the operation rod 15 moves forward.

At that time, in the bush 22, the detectors 23 and 24 detect the distortion loads by displacement of the bush body 22a by the pedal force input from the brake pedal 11, and the ECU 25 estimates the angle dθL23 between the first and second straight lines L1 and L2 based on the ratio between the distortion loads detected by the detectors 23 and 24 and calculates the operation amount of the brake pedal 11, that is to say, the pedal force and the pedal stroke based on the angle dθL23.

In this manner, in the pedal operation amount detecting apparatus of the first embodiment, the brake pedal 11 and the crevice 16 fixed to the end portion of the operation rod 15 are rotatably coupled by the coupling shaft 18, the bush 22 is interposed between the brake pedal 11 and the coupling shaft 18, the detectors 23 and 24 are mounted on the outer peripheral surface of the bush body 22a, which can be elastically deformed, of the bush 22, and the ECU 25 estimates the angle between the brake pedal 11 and the operation rod 15 based on the ratio between the distortion loads detected by the detectors 23 and 24 and calculates the operation amount of the brake pedal 11, that is to say, the pedal force and the pedal stroke, based on the angle.

Therefore, when the brake pedal 11 is depressed, the detectors 23 and 24 detect the distortion loads acting between the brake pedal 11 and the coupling shaft 18, and the ECU 25 estimates the angle θL23 between the first straight line L1 connecting a rotation center O1 of the brake pedal 11 and a coupling point O2 of the brake pedal 11 and the operation rod 15 and the second straight line L2 along the linear motion direction of the operation rod 15, that is to say, the angle between the brake pedal 11 and the operation rod 15, based on the ratio between the distortion loads detected by the detectors 23 and 24, and calculates the operation amount of the brake pedal 11, that is to say, the pedal force and the pedal stroke, based on the angle, so that another member for transmitting the pedal force and the pedal stroke of the brake pedal 11 to the detectors 23 and 24 is not necessary and a simple configuration can be obtained to improve mountability and detection accuracy.

Also, the detectors 23 and 24 can be easily mounted by detecting the distortion load acting on a contact portion between the brake peal 11 and the coupling shaft 18, and simplicity of configuration and ease of manufacture can be improved. By arranging a plurality of detectors 23 and 24 at a predetermined angle in a peripheral direction of the coupling shaft 18 to detect the distortion loads at a plurality of different positions in the peripheral direction of the coupling shaft 18, the pedal force can be detected with a high degree of accuracy regardless of a rotation angle of the brake pedal 11.

Second Embodiment

Figure 5:
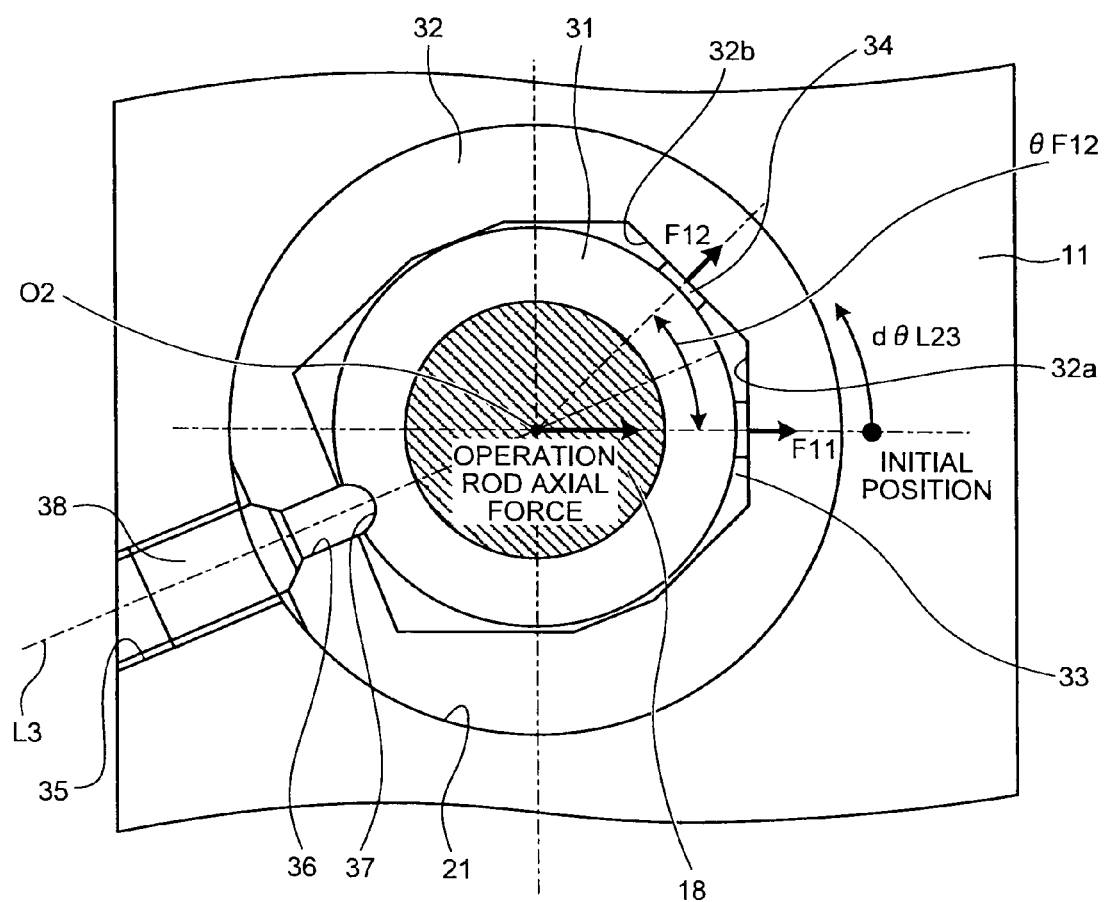
FIG. 5 is a cross-sectional view showing an arrangement configuration of detectors in the pedal operation amount detecting apparatus according to a second embodiment of the present invention.

FIG. 5 is a cross-sectional view showing an arrangement configuration of the detectors in the pedal operation amount detecting apparatus according to a second embodiment of the present invention. Meanwhile, an entire configuration of the pedal operation amount detecting apparatus of this embodiment is substantially similar to that of the above-described first embodiment, so that this is described with reference to FIG. 3 and the same reference numeral is given to the member having the function similar to that described in this embodiment, and the description thereof is not repeated.

The pedal operation amount detecting apparatus of the second embodiment is for detecting the pedal force and the pedal stroke as the pedal operation amount transmitted to the master cylinder and the brake booster by converting the rotational motion of the brake pedal 11 to the linear motion of the operation rod 15, as shown in FIGS. 3 and 5. An angle estimating unit for estimating the angle θL23 between the first straight line L1 connecting the rotation center O1 of the brake pedal 11 and the coupling point O2 of the brake pedal 11 and the operation rod 15 and the second straight line L2 along the linear motion direction of the operation rod 15, and the pedal operation amount calculating unit for calculating the brake pedal operation amount based on the angle θL23 estimated by the angle estimating unit are provided.

In this case, the angle estimating unit is provided on the coupling unit for coupling the brake pedal 11 and the operation rod 15 and has the load detecting unit for detecting the load acting on the coupling shaft 18 to estimate the angle θL23 between the first and second straight lines L1 and L2 based on the load detected by the load detecting unit.

That is to say, the circular coupling hole 21 having diameter larger than the outer diameter of the coupling shaft 18 is formed on the intermediate portion of the brake pedal 11. A cylindrical bush 31 has an inner peripheral surface that can fit to the outer peripheral surface of the coupling shaft 18. A substantially cylindrical collar 32 has an outer peripheral surface that can fit to the inner peripheral surface of the coupling hole 21. The collar 32 has an inner peripheral surface that has a multangular shape, and the bush 31 can be inserted therein.

The collar 32 is arranged such that the outer peripheral surface thereof is in close contact with the inner peripheral surface of the coupling hole 21 of the brake pedal 11, and the bush 31 is arranged in the collar 32. Also, the coupling shaft 18 passes through the forked portions 16a and 16b of the crevice 16 and passes through the bush 31, and the bush 31 and the coupling shaft 18 can slidingly contact each other.

In addition, two detectors 33 and 34 as the above-described load detecting units are mounted on the outer peripheral surface of the bush 31 so as to be spaced apart from each other by a predetermined distance in the peripheral direction. In this embodiment, the two detectors 33 and 34 are mounted on the outer peripheral surface of the bush 31 on the side opposed to the side to which the operation rod 15 is coupled, and the detectors 33 and 34 are arranged above and below a straight line L3 passing through the center O2 of the coupling shaft along the peripheral direction at regular intervals, and the detectors 33 and 34 are arranged with a predetermined angle θF12 therebetween, so that the loads at different positions in the peripheral direction of the coupling shaft 18 can be detected. Also, in the collar 32, flat surface portions 32a and 32b are formed on the inner peripheral surface thereof so as to be opposed to the detectors 33 and 34, the detectors 33 and 34 are interposed between the outer peripheral surface of the bush 31 and the flat surface portions 32a and 32b of the collar 32, and the detectors 33 and 34 can detect compressive loads between the bush 31 and the collar 32 at different positions in the peripheral direction of the coupling shaft 18.

Also, the pedal operation amount detecting apparatus of this embodiment is provided with supplementary load providing means for providing a supplementary load to the detectors 33 and 34 as the load detecting units. That is to say, in the brake pedal 11, a screw hole 35 is formed on the side to which the operation rod 15 is coupled from outside along the straight line L3 to communicate with the coupling hole 21, and a through hole 36 is formed on the collar 32 corresponding to the screw hole 35, and further a spherical concave portion 37 having diameter substantially the same as that of the through hole 36 is formed on the outer peripheral portion of the bush 31 corresponding to the through hole 36. A supplementary load adjusting bolt 38 as the supplementary load providing means screws together with the screw hole 35 of the brake pedal 11 and a tip end portion thereof passes through the through hole 36 to engage with the concave portion 37 of the bush 31 and presses the bush 31, thereby allowing the detectors 33 and 34 mounted on the outer peripheral surface of the bush 31 to closely contact the flat surface portions 32a and 32b of the collar 32 with no space therebetween to provide the supplementary load to the detectors 33 and 34. In this case, the supplementary load to be provided to the detectors 33 and 34 can be adjusted by changing pressing force of the bush 31 by adjusting a screw amount of the supplementary load adjusting bolt 38.

That is to say, when the brake pedal 11 is depressed, the reactive load acts on the bush 31 from the operation rod 15 through the crevice 16 against the load acting on the bush 31, so that the detectors 33 and 34 are compressed between the inner peripheral surface of the collar 32 and the outer peripheral surface of the bush 31 and the compressive loads can be detected.

Compressive loads F11 and F12 detected by the detectors 33 and 34, respectively, are input to the electronic control unit (ECU) 25 as the above-described angle estimating unit and the pedal operation amount calculating unit, and the ECU 25 estimates the angle θL23 between the first and second straight lines L1 and L2 based on the ratio between the compressive loads F11 and F12 detected by the detectors 33 and 34, respectively, and calculates the operation amount of the brake pedal 11, that is to say, the pedal force and the pedal stroke based on the angle θL23. Meanwhile, a specific example of a method of estimating the angle θL23 between the first and second straight lines L1 and L2 based on the ratio between the compressive loads detected by the detectors 33 and 34, and a method of calculating the pedal force and the pedal stroke of the brake pedal 11 based on the angle θL23, by the ECU 25 are similar to those of the above-described first embodiment, so that the description thereof is not repeated.

Therefore, when the crew depresses the brake pedal 11, the brake pedal 11 rotates clockwise in FIGS. 3 and 5 about the support shaft 13 by the pedal force. Then, the pedal force is input from the brake pedal 11 to the crevice 16 through the coupling shaft 18, and further is transmitted from the crevice 16 to the operation rod 15, and the operation rod 15 moves forward.

At that time, the detectors 33 and 34 detect the compressive loads by being compressed by the pedal force input from the brake pedal 11, and the ECU 25 estimates the angle dθL23 between the first and second straight lines L1 and L2 based on the ratio between the compressive loads detected by the detectors 33 and 34 and calculates the operation amount of the brake pedal 11, that is to say, the pedal force and the pedal stroke based on the angle dθL23.

In this manner, in the pedal operation amount detecting apparatus of the second embodiment, the brake pedal 11 and the crevice 16 fixed to the end portion of the operation rod 15 are rotatably coupled by the coupling shaft 18, the bush 31 and the collar 32 are interposed between the brake pedal 11 and the coupling shaft 18, the detectors 33 and 34 are mounted between the bush 31 and the collar 32, and the ECU 25 estimates the angle between the brake pedal 11 and the operation rod 15 based on the ratio between the compressive loads detected by the detectors 33 and 34 and calculates the operation amount of the brake pedal 11, that is to say, the pedal force and the pedal stroke based on the angle.

Therefore, when the brake pedal 11 is depressed, the detectors 33 and 34 are compressed by the bush 31 and the collar 32 between the coupling hole 21 of the brake pedal 11 and the coupling shaft 18, thereby detecting the compressive loads, and the ECU 25 estimates the angle θL23 between the first straight line L1 connecting the rotation center O1 of the brake pedal 11 and the coupling point O2 of the brake pedal 11 and the operation rod 15 and the second straight line L2 along the linear motion direction of the operation rod 15, that is to say, the angle between the brake pedal 11 and the operation rod 15, based on the ratio between the compressive loads detected by the detectors 33 and 34 to calculate the operation amount of the brake pedal 11, that is to say, the pedal force and the pedal stroke based on the angle, so that another member for transmitting the pedal force and the pedal stroke of the brake pedal 11 to the detectors 33 and 34 is not necessary and the simple configuration can be obtained to improve the mountability and the detection accuracy.

Also, the detectors 33 and 34 can be easily mounted by detecting the compressive loads acting on the contact portion between the brake pedal 11 and the coupling shaft 18, and simplicity of configuration and ease of manufacture can be improved. Also, the pedal force can be detected with a high degree of accuracy regardless of the rotation angle of the brake pedal 11 by arranging a plurality of detectors 33 and 34 at a predetermined angle in the peripheral direction of the coupling shaft 18 and detecting the distortion loads at a plurality of different positions in the peripheral direction of the coupling shaft 18.

Further, the screw hole 35 and the through hole 36 are formed on the brake pedal 11 from the outside to communicate with the coupling hole 21, the concave portion 37 is formed on the outer peripheral portion of the bush 31 corresponding to the through hole 36, the supplementary load adjusting bolt 38 screws together with the screw hole 35, and the tip end portion thereof is engaged with the concave portion 37 of the bush 31 and presses the same. Therefore, the bush 31 can be appropriately supported to improve support rigidity, by allowing the detectors 33 and 34 mounted on the outer peripheral surface of the bush 31 to closely contact the flat surface portions 32a and 32b of the collar 32 with no space therebetween and providing the supplementary load to the detectors 33 and 34, and the detectors 33 and 34 can detect the load acting between the brake pedal 11 and the coupling shaft 18 with a high degree of accuracy, and as a result, cost thereof can be reduced.

Also, by changing the pressing force of the bush 31 by adjusting the screw amount of the supplementary load adjusting bolt 38, the supplementary load to be provided to the detectors 33 and 34 can be adjusted, and the detectors 33 and 34 can closely contact the inner peripheral surface of the collar 32 with no space therebetween even when there is a variation in the manufacturing accuracy, and the high detection accuracy by the detectors 33 and 34 can be secured.

Third Embodiment

Figures 1, 6:
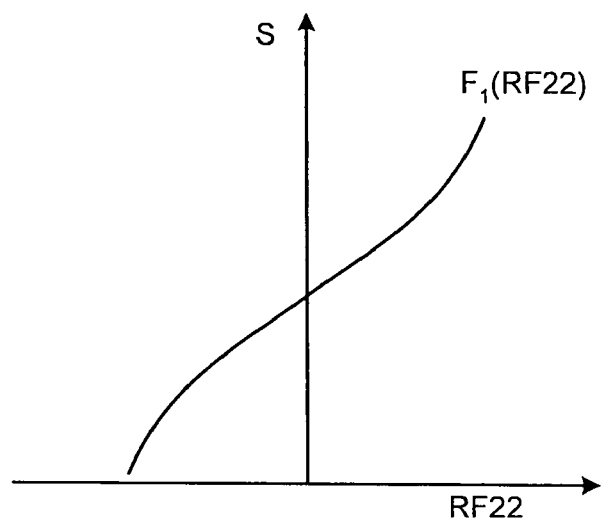
Figures 2, 6:
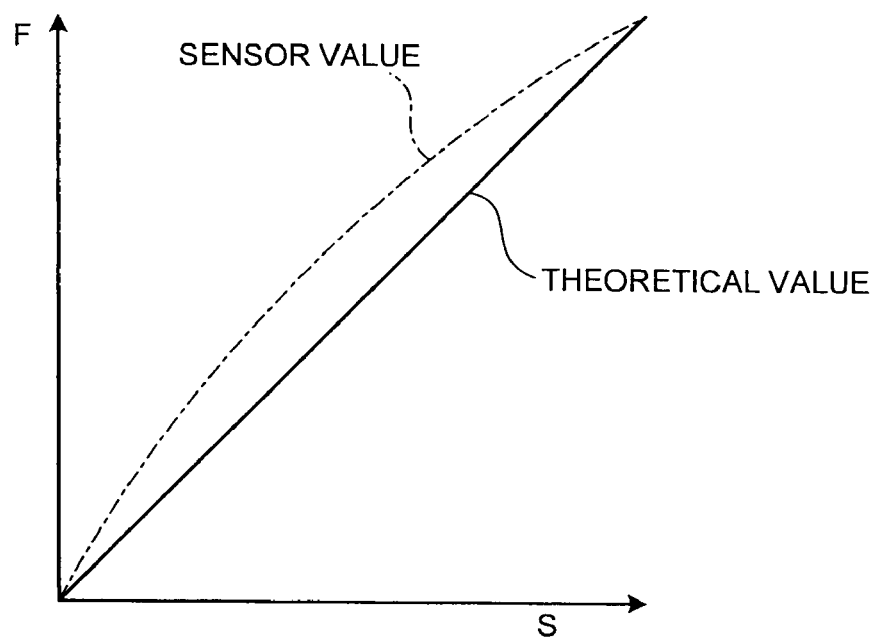
Figures 3, 6:
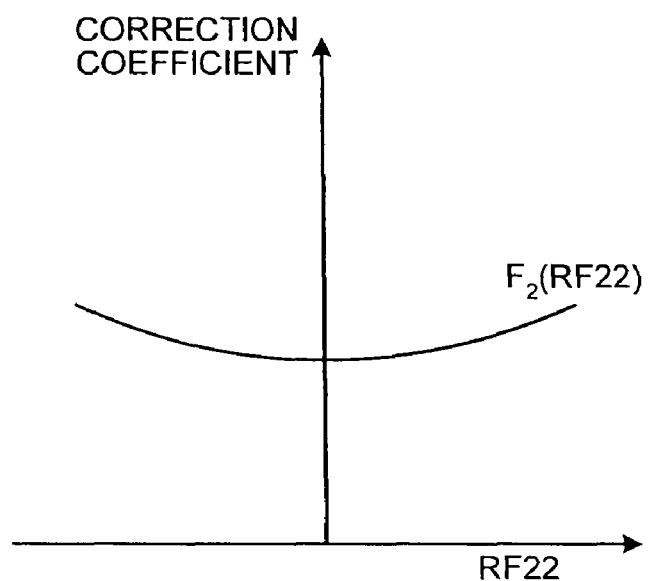

FIG. 6-1 is a graph showing the pedal stroke with respect to a load variation average in the pedal operation amount detecting apparatus according to a third embodiment of the present invention, FIG. 6-2 is a graph showing a booster input load with respect to the pedal stroke in the pedal operation amount detecting apparatus of the third embodiment, FIG. 6-3 is a graph showing a correction coefficient with respect to the load variation average in the pedal operation amount detecting apparatus of the third embodiment, FIG. 7-1 is a graph showing a stroke converted differential value for calculating the pedal stroke by a first-order averaging, and FIG. 7-2 is a graph showing the stroke converted differential value for calculating the pedal stroke by the first-order averaging and a trigonometric function conversion. Meanwhile, an entire configuration of the pedal operation amount detecting apparatus of this embodiment is substantially similar to that of the above-described second embodiment, so that the configuration is described with reference to FIG. 5, and the same reference numeral is given to the member having the function similar to that described in this embodiment and the description thereof is not repeated.

The pedal operation amount detecting apparatus of the third embodiment is for detecting the pedal force and the pedal stroke as the pedal operation amount transmitted to the master cylinder and the brake booster by converting the rotational motion of the brake pedal 11 to the linear motion of the operation rod 15, as shown in FIGS. 3 and 5. In addition, the angle estimating unit for estimating the angle θL23 between the first straight line L1 connecting the rotation center O1 of the brake pedal 11 and the coupling point O2 of the brake pedal 11 and the operation rod 15 and the second straight line L2 along the linear motion direction of the operation rod 15, and the pedal operation amount calculating unit for calculating the brake pedal operation amount based on the angle θL23 estimated by the angle estimating unit are provided.

In this case, the angle estimating unit is provided on the coupling unit for coupling the brake pedal 11 and the operation rod 15 and has the load detecting unit for detecting the load acting on the coupling shaft 18 to estimate the angle θL23 between the first and second straight lines L1 and L2 based on a change in the load detected by the load detecting unit, specifically, a change in force component.

That is to say, the compressive loads F11 and F12 detected by the detectors 33 and 34, respectively, are input to the electronic control unit (ECU) 25 as the angle estimating unit and the pedal operation amount calculating unit, and the ECU 25 estimates the angle θL23 between the first and second straight lines L1 and L2 based on the ratio between the compressive loads F11 and F12 detected by the detectors 33 and 34, respectively, and a deviation of the compressive loads F11 and F12, by converting them to the trigonometric function and averaging, and calculates the operation amount of the brake pedal 11, that is to say, the pedal force and the pedal stroke, based on the angle θL23.

Specifically, when the brake pedal 11 is depressed, in the bush 22, the bush body 22a is deformed with the supporting units 22b and 22c as the base points, so that the detector 23 detects the loads F11 and the detector 24 detects the load F12, respectively. The ECU 25 estimates the angle dfL23 between the first and second straight lines L1 and L2 based on the ratio between the load F11 detected by the detector 23 and the load F12 detected by the detector 24, and the deviation thereof.

Herein, a method of estimating by the ECU 25 the angle dθL23 between the first and second straight lines L1 and L2 based on the ratio between the load F11 detected by the detector 23 and the load F12 detected by the detector 24 to obtain the pedal force F and the pedal stroke S from the angle dθL23 is described.

Ratio (load variation average) RFb between the load and the load deviation is defined by the following equation:

$$RF22=(F12-F11)/F11+(F12-F11)/F20$$

Herein, since the load average F20=F11+F12, $$RF22=F12/F11-F11/F12$$

Therefore, the angle dθL23 can be defined as the function based on the load variation average RF22.

When the load variation average RF22 corresponding to the angle dθL23 is thus obtained, the pedal stroke S is calculated by the following equation. Herein, $F_1$ is a function according to the assembled state of the brake pedal 11 and the operation rod 15 and is defined as shown in FIG. 6-1.

$$S=F_1(RF22)$$

Also, in relationship between the pedal stroke S and the pedal force F, as shown in FIGS. 6-2, difference occurs between a sensor value and a theoretical value. Therefore, the correction coefficient (stroke converted value) becomes necessary and the pedal force (operation rod axial force) F is calculated by the following equation. Herein, F2 is the correction coefficient (stroke converted value) and is defined as shown in FIG. 6-3.

$$F=F20 \times F_2(RF22)$$

Therefore, when the crew depresses the brake pedal 11, the brake pedal 11 rotates clockwise in FIGS. 3 and 5 about the support shaft 13 by the pedal force. Then, the pedal force is input from the brake pedal 11 to the crevice 16 through the coupling shaft 18, and further is transmitted from the crevice 16 to the operation rod 15, and the operation rod 15 moves forward.

At that time, the detectors 33 and 34 detect the compressive loads by being compressed by the pedal force input from the brake pedal 11, and the ECU 25 estimates the angle dθL23 between the first and second straight lines L1 and L2 based on the ratio between the compressive loads detected by the detectors 33 and 34 and calculates the operation amount of the brake pedal 11, that is to say, the pedal force and the pedal stroke, based on the angle dθL23.

In this case, when the ratio (load variation average) RFb between the load and the load deviation is calculated based on the loads F11 and F12 detected by the detectors 33 and 34, respectively, and the pedal force F is calculated using the stroke converted value $F_2$ from the load variation average RFb, the stroke converted value $F_2$ changes according to an operation angle of the brake pedal 11. At that time, when the pedal force F is calculated by the first-order averaging, as shown in FIG. 7-1, the stroke converted differential value widely varies between −0.037 to −0.029 according to the operation angle of the brake pedal 11. On the other hand, when the pedal force F is calculated by the first-order averaging and the trigonometric function conversion, as shown in FIG. 7-2, the stroke converted differential value converges in a range from −0.029 to −0.0282 according to the operation angle of the brake pedal 11.

In this manner, in the pedal operation amount detecting apparatus according to the third embodiment, the brake pedal 11 and the crevice 16 fixed to the end portion of the operation rod 15 are rotatably coupled by the coupling shaft 18, the bush 31 and the collar 32 are interposed between the brake pedal 11 and the coupling shaft 18, the detectors 33 and 34 are mounted between the bush 31 and the collar 32, and the ECU 25 estimates the angle between the brake pedal 11 and the operation rod 15 based on the ratio between the compressive loads detected by the detectors 33 and 34 and the load deviation and calculates the operation amount of the brake pedal 11, that is to say, the pedal force and the pedal stroke, based on the angle.

Therefore, when the brake pedal 11 is depressed, the detectors 33 and 34 are compressed by the bush 31 and the collar 32 between the coupling hole 21 of the brake pedal 11 and the coupling shaft 18, thereby detecting the compressive loads, and the ECU 25 estimates the angle between the brake pedal 11 and the operation rod 15 based on the ratio between the compressive loads F11 and F12 detected by the detectors 33 and 34, respectively, and the deviation thereof, that is to say, the load variation average RF22, and calculates the operation amount of the brake pedal 11, that is to say, the pedal force and the pedal stroke, based on the angle, and in this case, the detection accuracy can be improved with respect to the operation angle of a specified brake peal 11 by using the first-order averaging and the trigonometric function conversion.

Meanwhile, although the detectors 33 and 34 are mounted on the outer peripheral surface of the bush 31 to detect the compressive loads by the outer peripheral surface of the bush 31 and the flat surface portions 32a and 32b of the collar 32 in the above-described second and third embodiments, the configuration is not limited to this. For example, the collar 32 may be omitted, and the detectors 33 and 34 may be mounted on the outer peripheral surface of the bush 31 to detect the compressive load by the outer peripheral surface of the bush 31 and the inner peripheral surface of the coupling hole 21, or the detectors 33 and 34 may be mounted on the inner peripheral surface of the bush 31 to detect the compressive load between the inner peripheral surface of the bush 31 and the outer peripheral surface of the coupling shaft 18.

Also, although the bushes 22 or 31 is interposed between the brake pedal 11 and the coupling shaft 18 and the detectors 23 and 24 or 33 and 34 are provided on the bushes 22 or 31, respectively, in the above-described embodiments, they may be provided between the coupling shaft 18 and the operation rod 15, for example, between the crevice 16 and the coupling shaft 18 or between the crevice 16 and the operation rod 15. Also, although two detectors 23 and 24 or 33 and 34 are arranged in the embodiments, the number thereof is not limited to this and may be appropriately set according to attachability and accuracy.

INDUSTRIAL APPLICABILITY

As described above, the pedal operation amount detecting apparatus according to the present invention is capable of improving the mountability by simplifying the configuration and of detecting the operation amount with a high degree of accuracy, by detecting the pedal operation amount based on the angle between the operation pedal and the operation rod, and is useful in any pedal operation amount detecting apparatus.

The invention claimed is:

1. A pedal operation amount detecting apparatus for detecting a pedal operation amount transmitted to an operation target unit by converting rotational motion of an operation pedal to linear motion of an operation rod, the apparatus comprising:
an angle estimating unit that estimates an angle between a first straight line connecting a rotation center of the operation pedal and a coupling point of the operation pedal and the operation rod and a second straight line along a linear motion direction of the operation rod; and
a pedal operation amount calculating unit that calculates a pedal operation amount based on an angle estimated by the angle estimating unit.

2. The pedal operation amount detecting apparatus according to claim 1, further comprising a load detecting unit provided on a coupling unit for coupling the operation pedal and the operation rod that detects a load acting on the coupling unit, and the angle estimating unit estimates an angle between the first and second straight lines based on a load detected by the load detecting unit.

3. The pedal operation amount detecting apparatus according to claim 2, wherein the operation pedal and the operation rod are coupled by a coupling member, and the load detecting unit is interposed between the operation pedal and the coupling member or between the coupling member and the operation rod.

4. The pedal operation amount detecting apparatus according to claim 2, wherein a plurality of the load detecting units are provided at different positions in a rotational direction of the operation pedal.

5. The pedal operation amount detecting apparatus according to claim 2, wherein a bush is provided between the operation pedal and the coupling member or between the coupling member and the operation rod, and the load detecting unit detects a distortion amount of the bush.

6. The pedal operation amount detecting apparatus according to claim 2, wherein a bush is provided between the operation pedal and the coupling member or between the coupling member and the operation rod, and the load detecting unit detects a compressive load of the bush.

7. The pedal operation amount detecting apparatus according to claim 1, wherein the pedal operation amount calculating unit calculates pedal force as the pedal operation amount based on an angle estimated by the angle estimating unit.

8. The pedal operation amount detecting apparatus according to claim 1, wherein the pedal operation amount calculating unit calculates a pedal stroke as the pedal operation amount based on an angle estimated by the angle estimating unit.

9. The pedal operation amount detecting apparatus according to claim 2, wherein the angle estimating unit estimates an angle between the first and second straight lines based on a change in the load detected by the load detecting unit.

10. The pedal operation amount detecting apparatus according to claim 9, wherein a plurality of the load detecting units are provided at different positions in a rotational direction of the operation pedal, and the angle estimating unit estimates an angle between the first and second straight lines based on a ratio between loads detected by the plurality of the load detecting units.

11. The pedal operation amount detecting apparatus according to claim 9, wherein a plurality of the load detecting units are provided at different positions in a rotational direction of the operation pedal, and the angle estimating unit estimates an angle between the first and second straight lines based on a ratio between loads detected by the plurality of the load detecting units and a load deviation.

* * * * *